United States Patent [19]

Yang

[11] Patent Number: 4,461,869

[45] Date of Patent: Jul. 24, 1984

[54] PROCESS FOR MAKING LOW FUSION DISPERSION RESINS

[75] Inventor: Henry W. Yang, Avon Lake, Ohio

[73] Assignee: The B. F. Goodrich Company, Akron, Ohio

[21] Appl. No.: 335,793

[22] Filed: Dec. 30, 1981

[51] Int. Cl.³ .............................................. C08L 33/08
[52] U.S. Cl. .................................... 525/80; 525/309
[58] Field of Search ................... 526/201; 525/80, 309

[56] References Cited

U.S. PATENT DOCUMENTS

| | | | |
|---|---|---|---|
| 2,857,368 | 10/1958 | Ingraham et al. | 526/201 |
| 3,725,367 | 4/1973 | Kemp | 526/201 |
| 4,331,788 | 5/1982 | Arnal et al. | 526/201 |

FOREIGN PATENT DOCUMENTS

| | | | |
|---|---|---|---|
| 30524 | 6/1981 | Sweden | 526/201 |
| 928556 | 6/1963 | United Kingdom | 526/201 |
| 972685 | 10/1964 | United Kingdom | 525/309 |
| 1093974 | 12/1967 | United Kingdom | 525/309 |
| 1309581 | 3/1973 | United Kingdom | 526/201 |

Primary Examiner—Joseph L. Schofer
Assistant Examiner—N. Sarofim
Attorney, Agent, or Firm—Joe A. Powell; Alan A. Csontos

[57] ABSTRACT

There is disclosed a process for producing low energy vinyl dispersion resins which, in a plastisol, can be fused either at lower temperatures or in a shorter period of time than the normal dispersion grade resins presently employed. The new vinyl resin is characterized by being a bimodal resin, i.e., containing large particles and small particles of polymer in a predetermined size and amount. The small particles are a vinyl homopolymer or copolymer made by a regular emulsion polymerization procedure. The large particles are a vinyl copolymer made employing a seeded emulsion overpolymerization procedure wherein the seed is either a vinyl homopolymer or a vinyl copolymer. The final bimodal resin is obtained from a blend of the small and large particle latices by drying, such as spray drying, for example.

17 Claims, No Drawings

PROCESS FOR MAKING LOW FUSION DISPERSION RESINS

BACKGROUND OF THE INVENTION

In the customary polymerization of vinyl monomers, by the emulsion polymerization process, suitable latices have been difficult to obtain since the latices usually contain particles of varying size and are either too fine or too large. In addition to particle size uniformity, other properties of the polymers or resins produced by emulsion polymerization need to be improved, such as plastisol viscosity, clarity, gel temperature, as well as bloom and bleed properties in products made therefrom. Various proposals have heretofore been made to improve these properties with some success but not the ultimate success desired. For example, the use of various different emulsifiers and catalysts have been proposed. Also, varying the conditions of polymerization has been suggested. However, in most of these cases, too much coagulation occurred with the resulting latex containing too much coagulum or partially agglomerated particles which precipitate reducing the yield. Further, the shelflife of such latices leave much to be desired. It is desirable to have latices which change very little during storage with respect to viscosity and have and maintain good heat stability.

Another difficulty in producing vinyl dispersion polymers or resins by means of emulsion polymerization is the large amounts of emulsifier or soap that must be employed. These high levels not only entail high raw material costs, but also put limits on the desirable resin properties which one can attain with the emulsion polymerization procedure. A reduction in the amount of emulsifier or soap needed in the polymerization recipe would be most desirable.

In addition to the above difficulties, a most important problem today is the increasing cost of energy. As a result, there is a great need in the marketplace for a low energy vinyl polymer or resin. By low energy vinyl polymer or resin is meant one that can be processed either at a lower temperature or at a faster speed as compared to those vinyl resins currently available. This is particularly important in the case of the dispersion vinyl resins where a large amount of heat is needed to fuse the plastisols or organosols made therefrom. Accordingly, there is a need in the art for a method of making low fusion dispersion vinyl resins using low emulsifier and which result in improved plastisol properties.

SUMMARY OF THE INVENTION

It has been found that a low energy dispersion resin can be made which, in a plastisol, can be fused either at lower temperature or in a shorter time than the normal dispersion grade resins presently employed. The new resin of the present invention is characterized by being a bimodal resin, i.e., containing large particles and small particles of polymer in a predetermined size and amount. The small particles are a vinyl homopolymer or a copolymer made employing a regular emulsion polymerization procedure. The large particles are a vinyl copolymer made employing a seeded overpolymerization procedure wherein the seed is either a vinyl homopolymer or a vinyl copolymer. The final resin is obtained from the mixture of the small and large particle latices through either spray drying or through fluid energy drying, if the latices have been coagulated. Plastisols made from the resins of the present invention have good flow properties and the fused film made therefrom has high gloss, high clarity, and good mechanical strength, even when fused at low temperatures.

DETAILED DESCRIPTION

In the present invention, the terms "low fusion dispersion resins" and "low energy dispersion resins" refer to blends of homopolymers and copolymers prepared from vinyl and vinylidene halides, such as vinyl chloride, vinylidene chloride, and the like. The small size component of the polymer blend is a homopolymer or copolymer made using an emulsion polymerization technique. The large size component of the polymer blend is a copolymer made by seeded emulsion overpolymerization wherein the seed may be a homopolymer or a copolymer.

As pointed out above, the small size component is a homopolymer or copolymer and the most preferred polymer is polyvinyl chloride (PVC) or a vinyl chloride copolymer. For simplicity of description and convenience, the invention will be described in connection therewith, it being understood that this is merely intended in an illustrative sense and not limitative.

When using the emulsion polymerization procedure in making vinyl dispersion resins, such as PVC, the aqueous reaction medium will contain one or more emulsifiers, or an emulsifier system, such as a salt of a long chain saturated fatty acid, for example, an alkali metal or ammonium salt of a long chain saturated fatty acid, and a long straight chain saturated alcohol. The saturated fatty acids may be either natural or synthetic and should contain from 8 to 20 carbon atoms. As examples of such acids, there may be named lauric, myristic, palmitic, marganic, stearic, and the like, beef tallow, coconut oil, and the like. Good results are also obtained when anionic emulsifiers are employed, such as the alkali metal or ammonium salts of the sulfates of alcohols having from 8 to 18 carbon atoms. Examples of such emulsifiers are sodium lauryl sulfate, ethanolamine lauryl sulfate, ethylamine lauryl sulfate, and the like; alkali metal and ammonium salts of sulfonated petroleum and paraffin oils; sodium salts of hydrocarbon sulfonic acids, such as dodecane-1-sulfonic acid and octadiene-1-sulfonic acid; sodium salts of alphaolefin sulfonates; aralkyl sulfonates, such as sodium isopropyl benzene sulfonate, sodium dodecyl benzene sulfonate, sodium isobutyl naphthalene sulfonate, and the like; alkali metal and ammonium salts of sulfonate, and the like; alkali metal and ammonium salts of sulfonate dicarboxylic acid esters, such as sodium dioctyl sulfosuccinate, disodium-n-octadecyl sulfosuccinate, and the like; alkali metal and ammonium salts of the free acid of complex organic mono- and diphosphate esters, and the like. Nonionic emulsifiers, such as polyoxyethylene laurate, octyl- or nonylphenyl polyethoxyethanol, etc., may also be used. Vinyl dispersion polymer latices having excellent stability are obtained when using the alkali metal and ammonium salts of aromatic sulfonic acid, aralkyl sulfonates and long chain sulfonates. The emulsifier is employed in an amount in the range of about 0.2% to about 3.0% by weight, based on the weight of the monomer or monomers being polymerized. Preferably, the emulsifier is used in an amount in the range of about 0.5% to about 1.5% by weight. When using more than one emulsifier in the system, the combined weight will be in the same range.

In order to obtain certain desirable vinyl dispersion resin properties, in many instances a long straight chain saturated alcohol containing from 8 to 24 carbon atoms is employed in the emulsifier system. The addition of the alcohol to the emulsifier system increases the colloidal stability of the polymerization and reduces the amount of coagulum in the polymer latex and the amount of polymer buildup on the internal surfaces of the reactor. As examples of such alcohols, there may be named octanol, nonanol, decanol, undecanol, dodecanol, tridecanol, tetradecanol, pentadecanol, hexadecanol, heptadecanol, octadecanol, nonadecanol, eicosanol, heneicosanol, docosanol, tricosanol, tetracosanol, etc. Mixtures of the alcohols can also be used. Also lower carbon content alcohols can be employed when mixed with the longer chain length alcohols. When an alcohol is used, the weight ratio of alcohol to emulsifier(s) will be in the range of about 4 to about 0.1.

In all the polymerizations of the present invention, the same are conducted in the presence of a compound capable of initiating the polymerization reaction. Free radical yielding initiators, normally used for polymerizing olefinically unsaturated monomers, are satisfactory for use in the present invention. However, it is important that the initiator be water-soluble in order to obtain the proper size polymer particles. Useful initiators are the water-soluble peroxygen compounds, such as hydrogen peroxide, lauryl peroxide, and the like, and the sodium, potassium and ammonium persulfates used by themselves or in an activated redox system. Typical redox systems include alkali metal persulfates in combination with a reducing substance, such as sodium sulfite or sodium bisulfite, a reducing sugar, dimethylamino propionitrile, a diazomercapto compound and a water-soluble ferricyanide compound, or the like. Particularly useful are alkali metal and ammonium persulfate. The amount of initiator used will generally be in the range between about 0.01% to about 1.0% by weight, based on the weight of 100 parts of monomer or monomers being polymerized, and preferably between about 0.04% and about 0.2% by weight.

In the present invention the low fusion dispersion resin is a bimodal resin, the small particles of which are a vinyl homopolymer or copolymer and have a size in the range of about 0.1 to about 0.5 microns. The amount of comonomer(s) employed in making the small polymer particles will be in the range of about 0% to about 10% by weight, based on the weight of 100 parts of the principal monomer. The comonomers that may be employed in making the small polymer particles are polymerizable olefinic monomers having a terminal $CH_2=C<$ grouping.

The large polymer particles are made employing a seeded overpolymerization procedure, that is, either a vinyl homopolymer or a vinyl copolymer seed is overpolymerized with a comonomer(s). The seed polymer will have a size in the range of about 0.3 to about 0.7 micron and the overpolymerized large particles will have a size in the range of about 0.5 to about 1.5 microns.

The comonomers that may be employed in making the large polymer particles are polymerizable olefinic monomers having a terminal $CH_2=C<$ grouping. As examples of such olefinic monomers, there may be mentioned vinyl acetate, the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyano ethyl acrylate, $\alpha$-ethyl hexyl acrylate, and the like; esters of methacrylic acid, such as methyl methacrylate, butyl methacrylate, and the like; and other polymerizable olefinic monomers of the types known to those skilled in the art. The amount of comonomer(s) employed in making the large polymer particles will be in the range of about 1.0% to about 30.0% by weight, based on the weight of 100 parts of the principal monomer.

In seeded overpolymerization, the entire amount of comonomer can be batched into the reactor at the beginning of the reaction. However, it is preferred to proportion the comonomer into the reactor throughout the conversion cycle. It has been found that resins made by proportioning the comonomer into the process have lower Brookfield viscosity, higher tensile strength, and higher Severs efflux values than resins made by batching in the comonomer at the beginning of the reaction. It is to be understood, however, that batching in the comonomer works well and is included within the scope of the present invention.

The amount of homopolymer or copolymer seed employed in the overpolymerization will not only affect the final polymer particle size, but it will also affect the latex stability, since the total particle surface area is dependent on the size of the polymer particles. Also, it has been observed that for a bimodal distribution resin, as the particle size of the larger particles increases, the viscosity of a plastisol made therefrom decreases. This is noted by a decreasing Brookfield viscosity and increasing Severs efflux. This same trend has been observed when using a polymerizable olefinic comonomer in both the proportioning addition of comonomer and the batch addition of monomer to the process. In general, the amount of seed used in the overpolymerization to obtain satisfactory results will be in the range of about 3 parts to about 30 parts by weight, based on the weight of the monomer(s) being polymerized. Preferably, an amount of polymer seed in the range of about 6 parts to about 20 parts by weight is employed.

The temperatures at which the polymerization reactions are conducted are important since the inherent viscosity (IV) of the plastisols made with low fusion vinyl dispersion resins thus produced is a direct function of the temperatures of the reactions. That is, the higher the temperature, the lower the IV. Accordingly, the end use for the low fusion vinyl dispersion resins to be produced will normally dictate the polymerization reaction temperature. It has been found that for the end uses to which the low fusion vinyl dispersion resins of the present invention are particularly adapted, polymerization temperatures in the range of about 35° C. to about 75° C. are satisfactory. Preferably, however, temperatures in the range of about 40° C. to about 60° C. will be employed. These temperature ranges include making both the small particle size latex and large particle size latex by overpolymerization.

In general, when using the emulsion polymerization technique, as the temperature of the reaction is increased, the polymer buildup on the inner surfaces of the reactor increases. However, in the present invention, the polymer buildup is substantially reduced. This is accounted for by the reduction in the amount of emulsifier that is employed in the reactions. The small amount of polymer buildup that does form is not of the hard crusty type and can readily be removed by rinsing or hosing down with water and without opening the reactor when appropriate spray nozzles are installed in the reactor.

After the polymerization reactions are complete, the small size polymer particle latex is blended with, or mixed with, the overpolymerization latex. Thereafter, the low fusion dispersion resin is isolated in powder form from the blended latices by means of spray drying. That is, a fine spray of the blended polymer latices is injected into a heated air chamber, thereby removing the water and recovering the dried low fusion dispersion resin in powder form. Alternatively, the low fusion dispersion resin can be precipitated, or coagulated, from latices before or after blending by the addition of a coagulating agent, such as alum, for example, or by adjusting the pH of the latex using an acid or a base, depending on the type of surfactant employed. The low fusion resin is then recovered in dry powder form from the resulting slurry by means of filtering followed by fluid energy drying, such as in a fluid energy mill.

Plastisols are made with the low fusion vinyl dispersion resins of the present invention by uniformly blending or intimately mixing, by conventional means, with 100 parts by weight of the resin in powder form from about 30 to about 100 parts by weight of one or more plasticizers. The useful plasticizers for this purpose may be described as the alkyl and alkoxy alkyl esters of dicarboxylic acids or the esters of a polyhydric alcohol and monobasic acid. As examples of such plasticizers, there may be named dibutyl phthalate, dioctyl phthalate, dibutyl sebacate, dinonyl phthalate, di(2-ethylhexyl) phthalate, di(2-ethylhexyl) adipate, dilauryl phthalate, di-methyl tetra-chlorophthalate, butyl phthalyl butyl glycollate, glyceryl stearate, and the like. The preferred plasticizers are the liquid diesters of aliphatic alcohols having from 4 to 20 carbon atoms and dibasic carboxylic acids having from 6 to 14 carbon atoms.

The plastisols made from the low fusion vinyl dispersion resins should have the desired yield. Yield is simply defined as resistance to flow and is normally determined numerically through viscosity measurements employing well-known standard techniques. Normally, such values are arrived at by calculation from viscosity measurements using a Brookfield Model RVF Viscometer according to ASTM method of D1824-61T. Yield is determined from viscosity measurements of the plastisols at varying rpm's (revolutions per minute) after initial preparation and intervals of aging. The viscosity is measured in centipoises (cps) at a temperature of 23° C. In the specific examples that follow hereinafter, viscosity measurements were made a 2 rpm and 20 rpm and are expressed as $V_2$ and $V_{20}$, respectively.

To further illustrate the present invention, the following specific examples are given, it being understood that this is merely intended in an illustrative and not a limitative sense. In the examples, all parts and percents are by weight unless otherwise indicated.

EXAMPLE I

In this example, the low fusion resin was made in such manner that the large particle vinyl copolymer was a homopolymer of vinyl chloride (PVC) overpolymerized with vinyl chloride and methyl acrylate in one instance and with vinyl chloride and ethyl acrylate in another. The small particle size polymer used in making the low fusion resin was PVC in latex form. The small particle size PVC was made using the following recipe:

| | |
|---|---|
| Vinyl chloride | 100 parts |
| Water (demineralized) | 130 parts |
| Potassium persulfate | 0.017 part |
| Tridecyl sulfate (initial) | 0.090 part |
| Tridecyl sulfate (proportioned) | 0.800 part |

The ingredients of the recipe were charged to the reactor, except that most of the tridecyl sulfate was proportioned into the reactor during the course of polymerization. The reaction was conducted at 45° C. with agitation. Upon completion of the reaction, the polymer was found to have an average particle size ($d50$) of 0.3 micron. The PVC latex thus formed was set aside for use in making the low fusion resin.

Next, a PVC seed homopolymer was made using the following recipe and procedure:

| | |
|---|---|
| Vinyl chloride | 100 parts |
| Water (demineralized) | 170 parts |
| Potassium persulfate | 0.06 part |
| Tridecyl sulfate (initial) | 0.004 part |
| Tridecyl sulfate (proportioned) | 0.800 part |

The polymerization reaction was run at 50° C. The initiator (potassium persuflate) was added last when the reaction mixture reached 50° C. The emulsifier proportioning addition was started when the total solids in the reactor reached about 9%. The reaction was continued until a 15 psi pressure drop occurred, whereupon the reaction was stopped. The polymer latex thus formed was spray dried and the dry polymer recovered for use in the overpolymerization process. The average particle size of the PVC seed homopolymer was 0.5 micron.

The PVC seed homopolymer was then over-polymerized with vinyl chloride and methyl acrylate comonomer in two runs. In the first run, all the comonomer was added at the beginning of the reaction (batch) and in the second run, the comonomer was proportioned into the reactor during the course of the reaction (proportion). The same procedure was repeated using ethyl acrylate as the comonomer. The recipes employed were as follows:

| RUN NO. | 1 | 2 | 3 | 4 |
|---|---|---|---|---|
| PROCESS | BATCH | PROP. | BATCH | PROP. |
| INGREDIENTS | | | | |
| Vinyl chloride | 96 pts. | 96 pts. | 96 pts. | 96 pts. |
| Methyl acrylate | 4 | 4 | — | — |
| Ethyl acrylate | — | — | 4 | 4 |
| Water (demineralized) | 150 | 150 | 150 | 150 |
| PVC Seed | 10 | 10 | 10 | 10 |
| Polyoxyethylene laurate | 0.25 | 0.25 | 0.25 | 0.25 pt. |
| Potassium persulfate | 0.1 | 0.1 | 0.1 | 0.1 |
| Tridecyl sulfate (proportioned) | 0.7 | 0.7 | 0.7 | 0.7 |
| Comonomer addition rate (0-10 hours) | — | 76 cc/hr | — | 82 cc/hr. |

In each run a 15-gallon reactor was employed equipped with an agitator and jacketed for heating and cooling. The water was charged first and then the PVC seed was dispersed therein. The vinyl chloride was charged and in the case of runs 1 and 3, the comonomers was then charged. The polyoxyethylene laurate was added and the reactor heated to the reaction temperature of 50° C. Then the potassium persulfate initiator was charged to the reactor. Agitation was maintained throughout the charging procedure and the reaction period. When the reaction mixture reached a temperature of 50° C., the proportioning into the reactor of the tridecyl sulfate emulsifier was begun and likewise, the proportioning of the comonomer was begun in the case of runs 2 and 4. In each run, when a pressure drop of 15 psi occurred, the reaction was stopped. Each of the overpolymer latices thus produced were blended and mixed with the small particle size PVC latex described above. In each case, the blend comprised 70% overpolymer latex and 30% small particle size PVC latex. After thorough mixing and blending, each blend was spray dried to recover the bimodal resins in dry form.

Test plastisols were made with the bimodal resin from each run for evaluation purposes by blending 100 parts of bimodal resin with 62 parts of dioctyl phthalate plasticizer. Various tests were then run with the results shown in the following table:

tioning the comonomer. Further, the tensile strengths of the resins of the present invention are higher and the wet gel temperatures are lower than the control, both of which factors are indicative of low fusion bimodal resins.

EXAMPLE II

In this example a series of runs were made using methyl acrylate (MA) as the comonomer in making the overpolymerized copolymer. The same procedures were followed as in Example I in making the small particle size PVC, the seed PVC, and the overpolymer, except that, in the latter step, the PVC seed level was varied in order to determine the effect thereof on the resin properties of the finished bimodal resin. The overpolymer latices were blended with the small particle size PVC latex as in Example I. Test plastisols were made with the bimodal resin from each run in the same manner as shown in Example I. The test results are shown in the following table:

TABLE II

| | | RUN NO. | | | | |
|---|---|---|---|---|---|---|
| | | 5 | 6 | 7 | 8 | 9 |
| | | | | PROCESS | | |
| PVC SEED | | 4% MA PROPORTION | | | 4% MA BATCH | |
| LEVEL - PARTS | | 10 | 15 | 20 | 10 | 15 |
| BROOKFIELD VISCOSITY (IN CENTIPOISES [Cps. ]) | | | | | | |
| Initial | $V_2$ | 9,500 | 25,000 | 12,500 | 40,000 | 360,000 |
| | $V_{20}$ | 5,100 | 9,000 | 5,800 | 16,000 | 116,000 |
| 1 Day | $V_2$ | 11,000 | 38,000 | 17,000 | 57,500 | 700,000 |
| | $V_{20}$ | 6,200 | 13,400 | 7,400 | 23,000 | — |
| 7 Days | $V_2$ | 17,500 | 72,500 | 30,000 | 70,000 | $1 \times 10^6$ |
| | $V_{20}$ | 9,500 | 24,000 | 12,000 | 23,800 | — |
| WET GEL (°F.) | | 160 | 160 | 164 | 160 | 161 |
| TENSILE STRENGTH IN LBS./SQ.IN. FUSION TEMP. | | | | | | |
| | 225° F. | 480 | 570 | 490 | 480 | 430 |
| | 250° F. | 780 | 720 | 740 | 670 | 700 |
| | 275° F. | 1,400 | 920 | 990 | 1,100 | 840 |
| | 300° F. | 2,300 | 1,700 | 1,900 | 2,000 | 1,400 |
| | 325° F. | 2,600 | 2,100 | 2,500 | 2,500 | 1,600 |
| | 350° F. | 2,800 | 2,400 | 2,600 | 2,600 | 2,200 |
| SEVERS (95 psi.) | | 26 | 24 | 31 | 13 | Thick |

TABLE I

| RUN NO. | | 1 | 2 | 3 | 4 | CONTROL |
|---|---|---|---|---|---|---|
| PROCESS | | BATCH | PROP. | BATCH | PROP. | GEON 171* |
| BROOKFIELD VISCOSITY (IN CENTIPOISES [CPS. ]) | | | | | | |
| Initial | $V_2$ | 40,000 | 9,500 | 26,000 | 22,600 | 4,000 |
| | $V_{20}$ | 16,600 | 5,100 | 13,000 | 12,000 | 3,200 |
| 1 Day | $V_2$ | 57,500 | 11,000 | 50,000 | 34,000 | 6,000 |
| | $V_{20}$ | 23,000 | 6,200 | 16,500 | 14,400 | 4,600 |
| 7 Days | $V_2$ | 70,000 | 17,500 | 65,000 | 47,500 | 9,000 |
| | $V_{20}$ | 28,800 | 9,500 | 21,500 | 16,500 | 6,400 |
| WET GEL (°F.) | | 160 | 160 | 150 | 150 | 210 |
| TENSILE STRENGTH IN LBS./SQ.IN. FUSION TEMPERATURE | | | | | | |
| | 225° F. | 480 | 480 | 440 | 420 | — |
| | 250° F. | 670 | 730 | 680 | 750 | 340 |
| | 275° F. | 1,100 | 1,400 | 1,100 | 1,300 | 600 |
| | 300° F. | 2,000 | 2,300 | 1,900 | 2,000 | 1,100 |
| | 325° F. | 2,500 | 2,600 | 2,400 | 2,700 | 1,800 |
| | 350° F. | 2,600 | 2,800 | 2,300 | 2,300 | 2,300 |
| SEVERS (95 psi.) | | 13 | 26 | 24 | 26 | 26 |

*Standard dispersion PVC made by the BFGoodrich Co.

It can readily be seen from the above data that the plastisol viscosity is improved or lowered by propor- Again, as in Example I, the data shows the advantage of proportioning the monomer during the over-polymerization step.

The main advantage of the bimodal resins of the present invention is that they require less fusion energy than that required for normal vinyl dispersion resins. Further, the instant bimodal resins have far better plastisol flow properties than present commercial vinyl dispersion resins. Other advantages of the present invention will be readily apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. A process for producing low fusion bimodal vinyl dispersion resins by emulsion polymerization comprising,
   (1) preparing a small component polymer latex of a vinyl chloride in an aqueous medium in the presence of an emulsifier and a free radial yielding, water-soluble initiator to produce a polyvinyl chloride polymer having a particle size in the range of about 0.1 to about 0.5 micron;
   (2) preparing a seed polymer or vinyl chloride as described in (1), said polymer having a particle size in the range of about 0.3 to about 0.7 micron;
   (3) overpolymerizing said seed polymer of (2) with vinyl chloride and at least one other monomer selected from the group consisting of ethyl acrylate and methyl acrylate wherein the vinyl chloride is added at the beginning of the reaction and the other monomer is proportioned in during the course of the reaction, to give an overpolymer latex, said overpolymer having a particle size in the range of about 0.5 about 1.5 micron;
   (4) intimately blending the small component polymer latex of (1) and the overpolymer latex of (3), said latex blend containing from about 10% to about 40% of (1) and from about 90% to about 60% of (3); and
   (5) drying said latex blend and recovering the bimodal vinyl dispersion resin in dry powder form.

2. A process as defined in claim 1 wherein the polymer in (1) is polyvinyl chloride.

3. A process as defined in claim 1 wherein the seed polymer in (2) is polyvinyl chloride.

4. A process as defined in claim 1 wherein the seed polymer in (2) is a copolymer made from vinyl chloride and vinyl acetate.

5. A process as defined in claim 1 wherein the seed polymer in (2) is a copolymer made from vinyl chloride and methyl acrylate.

6. A process as defined in claim 1 wherein the vinyl monomer in (3) is vinyl chloride.

7. A process as defined in claim 1 wherein the monomers in (3) are vinyl chloride and methyl acrylate.

8. A process as defined in claim 1 wherein the monomers in (3) are vinyl chloride and ethyl acrylate.

9. A process as defined in claim 7 wherein the vinyl chloride is added at the beginning of the reaction and the methyl acrylate is proportioned in during the course of the reaction.

10. A process as defined in claim 8 wherein the vinyl chloride is added at the beginning of the reaction and the ethyl acrylate is proportioned in during the course of the reaction.

11. A process as defined in claim 9 wherein the seed polymer in (2) is polyvinyl chloride.

12. A process as defined in claim 10 wherein the seed polymer in (2) is polyvinyl chloride.

13. A process as defined in claim 1 wherein the blend of latices of (4) contains 30% of the latex of (1) and 70% of the overpolymer latex of (3).

14. A process as defined in claim 11 wherein the blend of latices of (4) contains 30% of the latex of (1) and 70% of the overpolymer latex of (3).

15. A process as defined in claim 12 wherein the blend of latices of (4) contains 30% of the latex of (1) and 70% of the overpolymer latex of (3).

16. A process as defined in claim 1 wherein the polymer in (1) is a copolymer of vinyl chloride and vinyl acetate.

17. A process as defined in claim 1 wherein the polymer in (1) is a copolymer of vinyl chloride and methyl acrylate.

* * * * *